(12) United States Patent
Yamamoto et al.

(10) Patent No.: US 6,254,191 B1
(45) Date of Patent: Jul. 3, 2001

(54) SEATBELT RETRACTOR

(75) Inventors: Kazuo Yamamoto; Yoshito Hashimoto, both of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/397,730

(22) Filed: Sep. 17, 1999

(30) Foreign Application Priority Data

Sep. 22, 1998 (JP) .................................................. 10-268269

(51) Int. Cl.[7] .................................................. A47C 31/00
(52) U.S. Cl. ......................................... 297/478; 242/384.4
(58) Field of Search .................................... 297/478, 479, 297/480; 242/384.4, 384.5, 384.6, 384.2; 280/806

(56) References Cited

U.S. PATENT DOCUMENTS

| | | | |
|---|---|---|---|
| 3,876,164 | * 4/1975 | Dully ................................ | 297/478 X |
| 4,438,551 | * 3/1984 | Imai ................................. | 297/479 X |
| 5,071,194 | * 12/1991 | Fohl ................................. | 297/478 |
| 5,333,906 | * 8/1994 | Fujimura et al. ................. | 297/478 X |
| 5,495,994 | * 3/1996 | Rumpf et al. .................... | 297/478 X |
| 5,716,102 | * 2/1998 | Ray et al. ......................... | 297/478 |
| 5,882,084 | * 3/1999 | Verellen et al. .................. | 297/478 |

FOREIGN PATENT DOCUMENTS

| | | |
|---|---|---|
| 8503541 | 4/1987 | (DE) . |
| 2562640 | 2/1998 | (JP) . |
| 10-157567 | 6/1998 | (JP) . |

* cited by examiner

*Primary Examiner*—Peter M. Cuomo
*Assistant Examiner*—Stephen Vu
(74) *Attorney, Agent, or Firm*—Crowell & Moring, L.L.P.

(57) ABSTRACT

A seatbelt retractor to be mounted in a backrest is provided with a sensor member for actuating a locking mechanism. Depending on an angle of reclining of the backrest, the sensing member is pivotal such that the spatial orientation of the sensing member is adjusted into a suitable orientation. The seatbelt retractor is also provided with one or both of a buffer mechanism and a locking adjusting mechanism to properly actuate the locking mechanism irrespective of the position of the sensing member.

17 Claims, 6 Drawing Sheets

SEATBELT RETRACTOR

BACKGROUND OF THE INVENTION

1. Field of the Invention

This invention relates to a seatbelt retractor to be mounted in a backrest. More specifically, this invention is concerned with a seatbelt retractor in which the spatial orientation of a sensing member responsible to a sudden acceleration, collision or deceleration is suitably adjustable depending on the angle of reclining of the backrest.

2. Description of the Related Art

As retractors for seatbelt systems each of which is used to safely hold a vehicle occupant or the like in a seat, emergency locking retractors have been used conventionally. To assure effective and safe restraint of an occupant, an emergency locking retractor is provided with an emergency locking mechanism to physically lock it by a sensing member which responds to a sudden acceleration, collision or deceleration.

Sensing members employed in these emergency locking retractors include those capable of sensing accelerations or tiltings of vehicle bodies. Such sensing members are each constructed in such a way that, when an inertia member is caused to move as a result of a collision of a vehicle body, for example, a sensor arm arranged on an upper part of the inertia member is caused to swing and a locking mechanism for locking rotation of a takeup spindle, on which a webbing is wound, in a webbing-releasing direction is then actuated.

In recent years, proposals have been made about seatbelt systems of the type that a retractor such as that mentioned above is mounted in a backrest of a reclining seat for a vehicle or the like and is operable similarly even when an angle of reclining of the backrest is changed.

For example, a seatbelt system disclosed in German Utility Model No. 8503541 makes it possible to maintain the spatial orientation of a sensing member in a suitable orientation irrespective of the angle of reclining of a backrest by causing a wire to move in accordance with a reclining operation of the backrest such that a sensor case is caused to pivot by the wire.

The above-described sensor case of the seatbelt system, however, undergoes swinging about a shaft which is located adjacent a position where a sensor arm and a ratchet wheel engage, so that the manner of contact (angle of contact) between a free end of the sensor arm and the ratchet wheel changes when the backrest is reclined and the spatial orientation of the sensing member varies. This change in the manner of contact involves a potential problem in that the sensor arm may fail to stop the ratchet wheel at a predetermined position and hence to allow a locking mechanism to function properly.

In a retractor making use of ratchet wheel, there is a correlation between the position of a sensor arm of a sensing member and a position where a locking mechanism is actuated, and a predetermined phase has been set. Moreover, there is a limitation to the position of the sensing member, where the locking mechanism can be properly actuated, and accordingly, it is improper to arrange the sensing member at a position other than the above-mentioned position. In a locking mechanism of the type that a rotation preventing member arranged on a takeup spindle is brought into engagement with an engaged tooth arranged on a retractor base when a ratchet wheel arranged on the takeup spindle is stopped from rotation and relative rotation takes place between the ratchet wheel and the takeup spindle, the timing of actuation of the locking mechanism varies unless the engaged tooth of the retractor base, said engaged tooth serving to set a locking position, and the engaged teeth of the ratchet wheel is constant in phase. In a construction of the type that locking is achieved by an engagement of a rotation preventing member with one of engaged teeth continuously arranged on a retractor base, a variation in the timing of actuation of the rotation preventing member may lead to such a situation that the rotation preventing member fails to reach a position where the rotation preventing member is supposed to engage one of the engaged teeth, thereby resulting in an insufficient engagement. Forced rotation of the takeup spindle to make this engagement sufficient is however not preferred because unduly large force acts, for example, on a sensor arm or the like. If the timing of actuation of the rotation preventing member varies and the position of the rotation preventing member and that of the engaged teeth of the retractor base become too close to each other, on the other hand, the rotation preventing member and the engaged teeth of the retractor base may hit each other at their edges, thereby possibly resulting in damages to the engaged teeth.

SUMMARY OF THE INVENTION

With the foregoing circumstances in view, the present invention has as an object the provision of a seatbelt retractor having high reliability in that, even when a backrest is in different reclined positions, accelerations of a vehicle body can be always sensed without failure to assure proper actuation of a locking mechanism.

The above-described object of the present invention can be achieved by a seatbelt retractor comprising:
- a retractor base to be mounted on a backrest;
- a takeup spindle rotatably supported on the retractor base;
- a locking mechanism for connecting the takeup spindle and the retractor base with each other via a pawl such that rotation of the takeup spindle in a webbing-releasing direction is locked;
- a sensing member for actuating the locking mechanism by sensing a predetermined acceleration or tilting, said sensing member being supported about the takeup spindle such that the sensing member is pivotal depending on an angle of reclining of the backrest; and
- a buffer mechanism incorporated in the locking mechanism such that, after the sensing member has acted on a portion of the locking mechanism, the portion is allowed to rotate relative to the takeup spindle until the takeup spindle and the retractor base are connected with each other via the pawl.

The above-described object of the present invention can also be achieved by a seatbelt retractor comprising:
- a retractor base to be mounted on a backrest;
- a takeup spindle rotatably supported on the retractor base;
- a locking mechanism for connecting the takeup spindle and the retractor base with each other via a pawl such that rotation of the takeup spindle in a webbing-releasing direction is locked;
- a sensing member for actuating the locking mechanism by sensing a predetermined acceleration or tilting, said sensing member being supported about the takeup spindle such that the sensing member is pivotal depending on an angle of reclining of the backrest; and
- a locking adjusting mechanism incorporated in the locking mechanism such that the takeup spindle and the retractor base can be connected in a predetermined relationship via the pawl irrespective of a position of the sensing member relative to the retractor base.

The above-described object of the present invention can also be achieved by a seatbelt retractor comprising:

a retractor base to be mounted on a backrest;

a takeup spindle rotatably supported on the retractor base;

a pawl supported on one of the takeup spindle and the retractor base;

plural engaged portions with which the pawl is engageable, said plural engaged portions being arranged on the other one of the takeup spindle and the retractor base;

a sensing member for sensing a predetermined acceleration or tilting, an adjusting mechanism for causing the sensing member to move relative to the retractor base depending on an angle of reclining of the backrest such that the spatial orientation of the sensing member is adjusted into a suitable orientation;

a transmission mechanism for transmitting rotation of the takeup spindle to the pawl upon actuation of the sensing member such that the pawl is brought into engagement with the engaged portions;

a ratchet wheel connected with the transmission mechanism and having engaged portions with which the sensing member can be brought into engagement upon actuation of the sensing member; and a buffer mechanism arranged between the engaged portions of the ratchet wheel and the transmission mechanism and, after the sensing member has been brought into engagement with the ratchet wheel, allowing the transmission mechanism to move until the pawl is brought into engagement with the engaged portions arranged on the other one of the takeup spindle and the retractor base.

The above-described object of the present invention can also be achieved by seatbelt retractor comprising:

a retractor base to be mounted on a backrest;

a takeup spindle rotatably supported on the retractor base;

a pawl supported on one of the takeup spindle and the retractor base;

plural engaged portions with which the pawl is engageable, said plural engaged portions being arranged on the other one of the takeup spindle and the retractor base;

a sensing member for sensing a predetermined acceleration or tilting, an adjusting mechanism for causing the sensing member to move relative to the retractor base depending on an angle of reclining of the backrest such that the spatial orientation of the sensing member is adjusted into a suitable orientation;

a transmission mechanism for transmitting rotation of the takeup spindle to the pawl upon actuation of the sensing member such that the pawl is brought into engagement with the engaged portions;

a ratchet wheel connected with the transmission mechanism and having engaged portions with which the sensing member can be brought into engagement upon actuation of the sensing member; and a locking adjusting mechanism for bringing the pawl into engagement with the engaged portions in a predetermined relationship irrespective of a position of engagement between the sensing member and the ratchet wheel, said locking adjusting mechanism being incorporated in the transmission mechanism.

According to the above-described constitution of the present invention, the sensing member is caused to pivot whenever the angle of reclining of the backrest is changed, so that the spatial orientation of the sensing member is maintained in a suitable orientation.

As the center of pivotal motion of the sensing member is designed to coincide with the center of rotation of the takeup spindle for the webbing, the sensing member can pivot about the center of rotation of the takeup spindle whenever the angle of reclining of the backrest is changed.

Since the interval between the sensing member and the center of rotation of the takeup spindle remains unchanged during the pivotal movement of the sensing member, the sensitivity of the sensing member can be maintained constant.

The incorporation of the buffer mechanism in the locking mechanism has made it possible to surely lock rotation of the takeup spindle in the webbing-releasing direction with the portion of the locking mechanism and the sensing member being maintained in engagement with each other.

Further, the arrangement of the locking adjusting mechanism has made it possible to complete the locking by the pawl in the same state because the position where the pawl initiates locking operation is set at a predetermined position irrespective of the position at which the sensing member acts on the locking mechanism. The edge of the pawl is therefore protected from damages.

It is accordingly possible to assure proper actuation of the locking mechanism irrespective of the angle of reclining.

According to the present invention, it is therefore possible to provide a high-reliability seatbelt retractor which irrespective of the angle of reclining, can surely sense an acceleration of a vehicle body and can properly actuate a locking mechanism.

DETAILED DESCRIPTION OF THE PREFERRED EMBODIMENT

The embodiment of the present invention will hereinafter be describe in detail based on the accompanying drawings.

Figure 1:
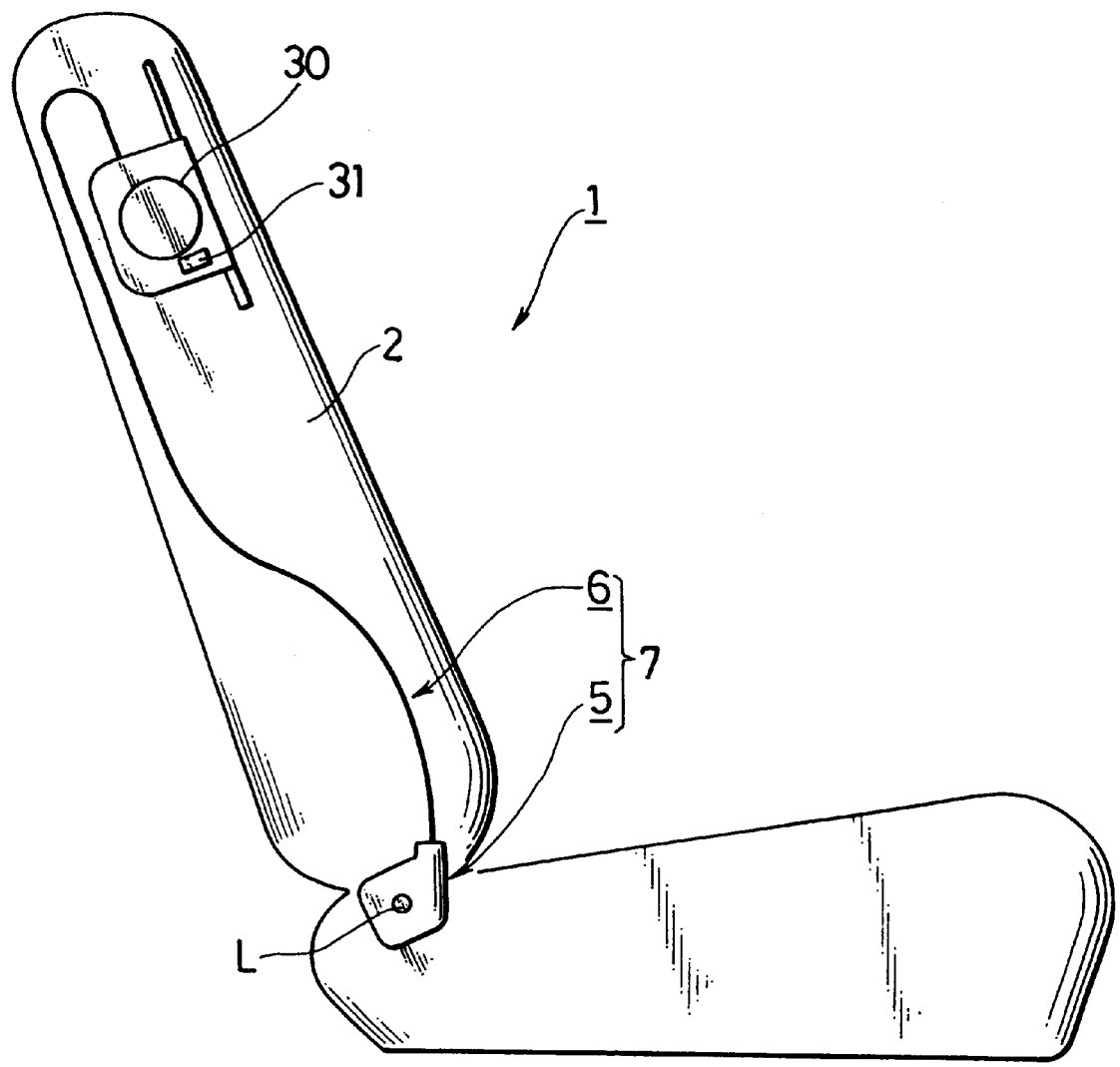
FIG. 1 is a schematic side view of a reclining seat with a seatbelt retractor according to an embodiment of the present invention mounted therewithin.

As is illustrated in FIG. 1, a seatbelt retractor 30 provided with a sensing member 31 is mounted within a backrest 2 of a reclining seat 1 which is in turn mounted on a vehicle body.

This backrest 2 is connected to a seat cushion such that the backrest 2 can pivot about a pivot L which extends in the direction of the width of the vehicle body, and the angle of reclining of the backrest 2 is adjustable in accordance with the physical constitution or the like of an occupant.

Figure 2:
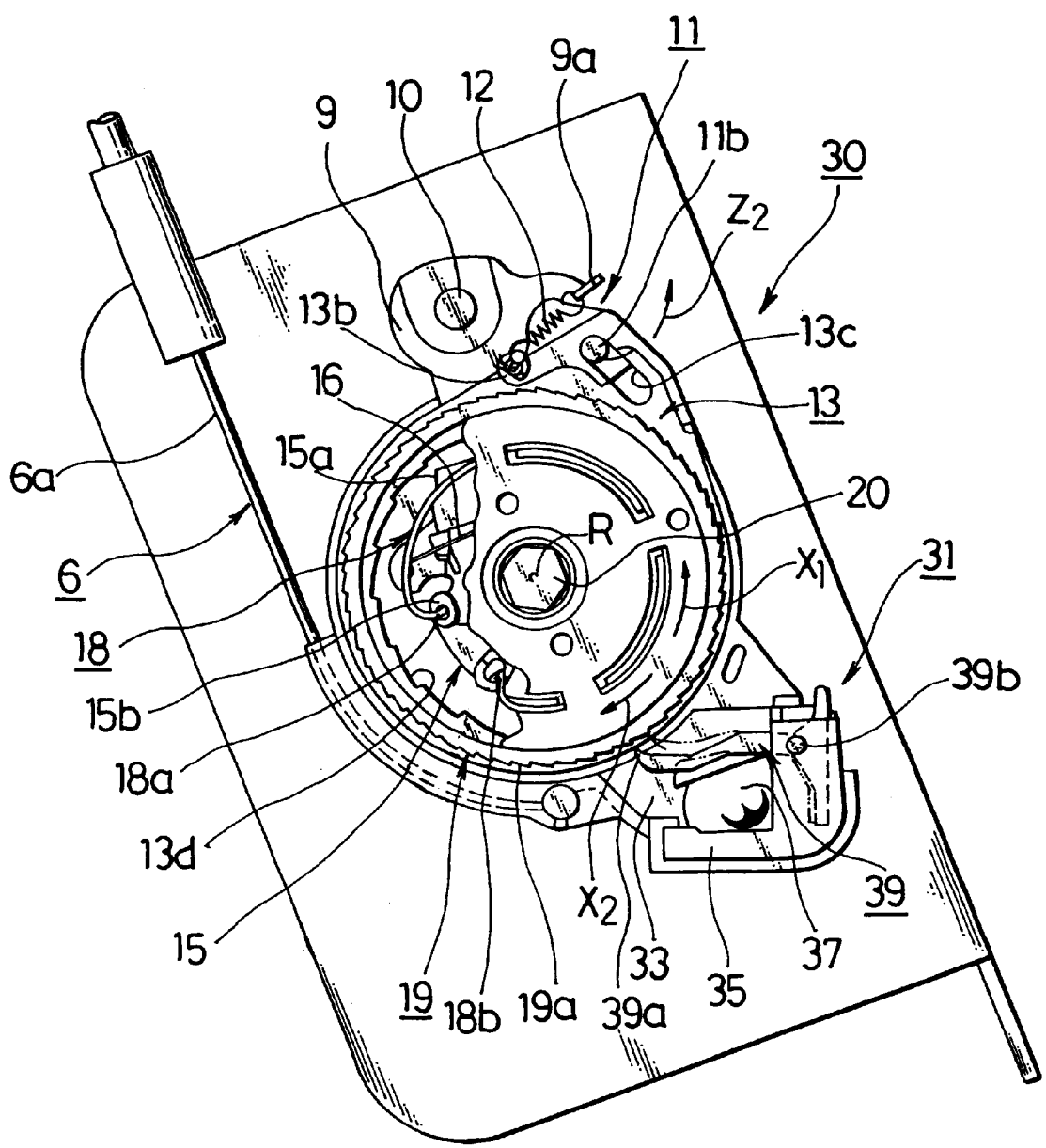
FIG. 2 is a schematic side view of the seatbelt retractor.

Reference is next had to FIG. 2. The sensing member 31 of the seatbelt retractor 30 comprises a hanger 33 mounted with the center of its pivotal motion coincided with a center R of rotation of a webbing takeup spindle, a sensor case 35 supported on the hanger 33 and provided with a inertia member supporting surface and also with a sensor arm supporting hole, a spherical inertia member 37 supported on the sensor case 35, and a sensor arm 39 which has a pivot 39b pivotally supported on the sensor case 35 and which is engageable with teeth 19a of a ratchet wheel 19 by a movement of the inertia member 37.

The sensing member 31 is designed such that its spatial orientation is suitably adjustable (into an orientation in which a bottom wall of the sensor case 35 becomes parallel to the ground) by an adjusting mechanism 7 which is constructed of a winding mechanism 5 and a transmission member 6. Described specifically, when the backrest 2 is reclined from the position shown in FIG. 1, a cable 6a—which is secured at opposite ends thereof on the hanger 33 and winding mechanism 5 of the sensing member 31, respectively—is wound in the winding mechanism 5 and the cable 6a is paid out from an end portion of the hanger 33 as much as the length of the cable 6a wound in the winding mechanism 5. As a result, the hanger 33 pivots clockwise so that the spatial orientation of the sensing member 31 is properly adjusted. Further, the center of pivotal motion of the hanger 33 is coincided with the center R of rotation of the takeup spindle, so that the interval between the ratchet wheel 19 and the sensor arm 39 remains unchanged.

The adjusting mechanism 7 is designed such that, even when the backrest 2 is turned forward from the position illustrated in FIG. 1, neither winding nor release of the cable 6a in or from the winding mechanism 5 takes place. A range of positions of the backrest 2 turned forward from the position shown in FIG. 1 is a range in which no occupant sits in the reclining seat 1. It is therefore designed that at these positions, the interlocking between a reclining operation and a pivotal movement of the sensing member 31 is canceled. However it is of course possible to design in such a way that the hanger 33 is caused to pivot counterclockwise in association with a forward turning operation of the backrest 2 to properly adjust the spatial orientation of the sensing member 31.

Figure 3:
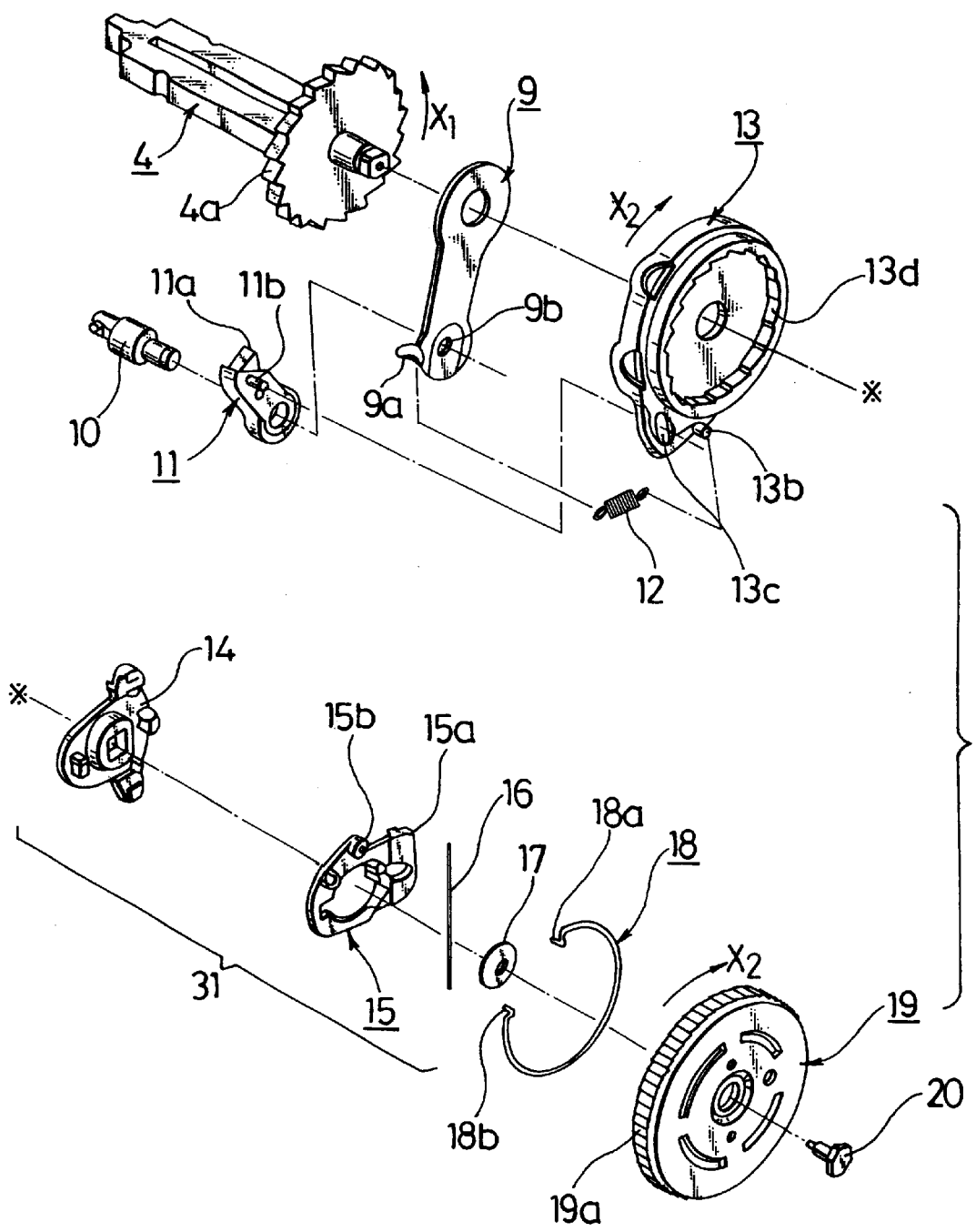
FIG. 3 is an exploded perspective view of a locking mechanism.

Referring next to FIG. 3, a description will be made about the construction of the locking mechanism which rotation of the takeup spindle in the webbing-releasing direction is locked in the event of a vehicular emergency such as a vehicular collision. As is depicted in FIG. 3, an emergency locking mechanism for preventing release of a webbing in the event of an emergency is arranged as a locking mechanism on an end of a takeup spindle 4. This emergency locking mechanism has a latch plate 4a fixed as an engaged portion on an end portion of the takeup spindle 4. Outwardly from the latch plate 4a, a portion of the takeup spindle 4 extends. On the outwardly extending portion of the takeup spindle 4, a tension plate 9 and a latch cup 13 are loose fitted. This latch cup 13, as a latch member, is provided with internal teeth 13d, the number of which is the same as that of teeth of the latch plate 4a and is twenty (20) in this embodiment. This internal teeth 13d constitute the locking adjusting mechanism. Further, a return spring 12 is hooked on a spring hanger 13b formed on the latch cup 13 and a spring hanger 9a formed on a tension plate 9, whereby biasing force which causes the latch cup 13 to turn in the direction of arrow $X_2$ is applied to the latch cup 13.

On the takeup spindle 4 located outside the latch cup 13, a flange 14 is fixedly secured. On the flange 14, a lock member 15 on which a locking portion 15a engageable with the above-described internal teeth 13d is formed is supported in such a way that the lock member 15 is movable substantially in the direction of the radius of the takeup spindle 4 but is prevented from rotation relative to the takeup spindle 4 in the direction of rotation of the takeup spindle 4. On an outer side of the lock member 15, a ratchet wheel 19 is arranged as an inertia member. This ratchet wheel 19 is loose fitted on a self-tapping screw 20 which is threadedly secured on the flange 14 via a plane washer 17. On an outer peripheral wall of the ratchet wheel 19, a plurality [for example, sixty (60)] of teeth 19a extending in the webbing-releasing direction are formed for engagement with the sensor arm 39 of the abovementioned sensing member 31. The number of these teeth 19a is set greater than the number of the internal teeth 13d of the latch cup 13. In a hollow cavity formed in an inner side of the ratchet wheel 19, a friction spring 18 which makes up a buffer mechanism is mounted in such a way that the friction spring 18 is normally in frictional engagement with the ratchet wheel 19 under its own spring force but, when force of predetermined value or greater is applied, the friction spring 18 is slidable against the ratchet wheel 19.

Since the friction spring 18 is hooked on the lock member 15, the ratchet wheel 19 rotates integrally with the takeup spindle 4 when not prevented from rotation, but is displaceable relative to the takeup spindle 4 when prevented from rotation.

The friction spring 18 has a symmetrical shape formed by forming a spring steel wire into a circular shape, provisionally bending its opposite end portions inwardly in a radial direction, and then bending the opposite end portions in a common axial direction to form hook portions 18a,18b. These hook portions 18a,18b are maintained in engagement with holes 15a,15b formed as a pair of engaged portions in the lock member 15, respectively, so that the friction spring 18 is restricted from deformation in the diameter-increasing direction and also in the diameter-decreasing direction.

The friction spring 18 mounted in the hollow cavity of the ratchet wheel 19 is normally maintained at an intermediate portion thereof in frictional engagement with the inner peripheral wall of the hollow cavity, so that the engagement force between the friction spring 18 and the holes 15a,15b of the lock member, the acting direction of which varies depending on the direction of rotation of the lock member 15 which rotates together with the takeup spindle 4, can be borne at the hook portions 18a,18b irrespective of the direction of rotation. As the diameter of the friction spring 18 neither increases nor decreases in the radial direction depending on the direction of rotation of the takeup spindle 4, the friction spring 18 has constant frictional resistance with the ratchet wheel 19 irrespective of the direction of rotation so that no excessive sliding resistance is developed between the friction spring 18 and the ratchet wheel 19.

A pawl—which as a rotation preventing member, prevents rotation of the latch plate 4a in the webbing-releasing direction (the direction of arrow $X_1$) as a result of engagement with the latch plate 4a—is rotatably supported via a pawl pin 10 on an outer side of a side plate of a retractor base such that an edge 11a of the pawl pin 10 can be brought into releasable engement with the latch plate 4a. The pawl pin 10 is inserted at an end portion thereof in a through-hole formed in the side plate of the retractor base and at an opposite end portion thereof in a through-hole 9b formed in the tension plate 9, whereby the pawl 11 is prevented from falling down under an engagement load between the pawl 11 and the latch plate 4a after the pawl 11 has been brought into engagement with the latch plate 4a. The pawl 11 is provided with a pawl guide pin 11b, which is inserted in a pawl guide slot 13c formed in a tab which is in turn formed on an outer peripheral portion of the latch cup 13.

A description will next be made about operation of the above-described seatbelt retractor 30.

A description will first be made of normal use. As is illustrated in FIG. 2, the latch cup 13 is biased in the webbing-winding direction (the direction of arrow $X_2$) under the biasing force of the return spring 12 mounted on the spring hanger 13b of the latch cup 13 and the spring hanger 9a of the tension plate 9, and the pawl 11 with its pawl guide pin 11b maintained in engagement with the pawl guide slot 13c is biased in a direction in which the pawl 11 is not engageable with the latch plate 4a (the direction of arrow $Z_2$). Under the biasing force of the sensor spring 16, the locking portion 15a of the lock member 15 is biased to a position where the locking portion 15a is not engageable with the internal teeth 13d of the latch cup 13. Accordingly, the webbing can be wound out as desired.

When tension is applied to the unillustrated webbing in the event of an emergency such as a collision and rotational force of a predetermined value or greater is hence applied as an impact in the webbing-releasing direction (the direction of arrow $X_1$) to the takeup spindle 4, the ratchet wheel 19 is subjected to inertia force and develops a lag in rotation relative to the rotation of the takeup spindle 4 in the webbing-releasing direction. When the force under which the hook portion 18a of the friction spring 18 mounted in the hollow cavity of the ratchet wheel 19 pushes an inner side wall of the hole 15b of the lock member 15 in a direction in which the locking portion 15a is brought into meshing engagement with the internal teeth 13d exceeds the biasing force of the sensor spring 16, the lock member 15 is moved in a direction in which the locking portion 15a is brought into meshing engagement with the internal teeth 13d. As this time, the intermediate portion of the friction spring 18 is in frictional engagement under appropriate frictional force with the inner peripheral wall of the hollow cavity of the ratchet wheel 19. The seatbelt retractor is therefore free of such a problem that due to unduly large force applied between the engaging portion 18a of the friction spring 18 and the hole 15b of the lock member 15, the engagement of the friction spring 18 with the lock member 15 may be released or the friction spring 18 may fall out of the hollow cavity of the ratchet wheel 19.

Figure 4A:
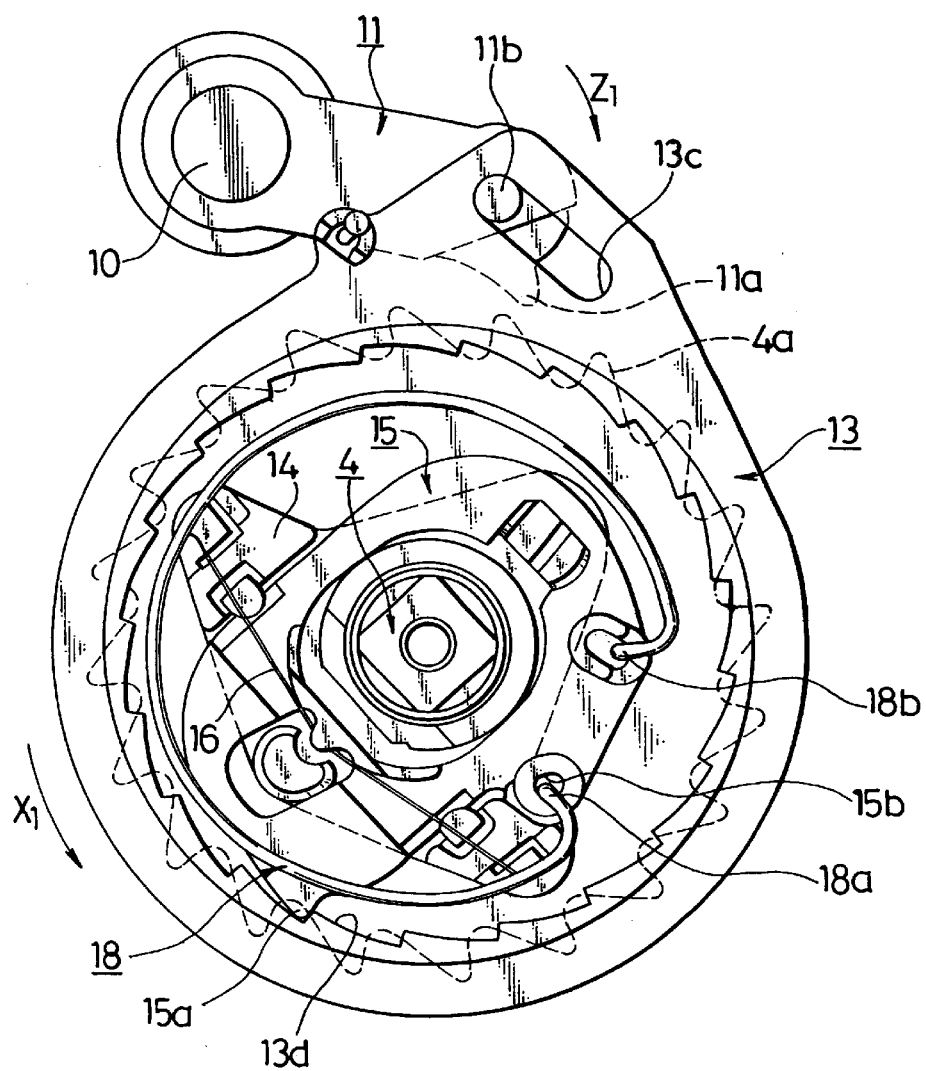
FIGS. 4A and 4B illustrate operation of the locking mechanism to lock rotation of a takeup spindle in a webbing-releasing direction upon a vehicular emergency such as a vehicular collision.
Figure 5:
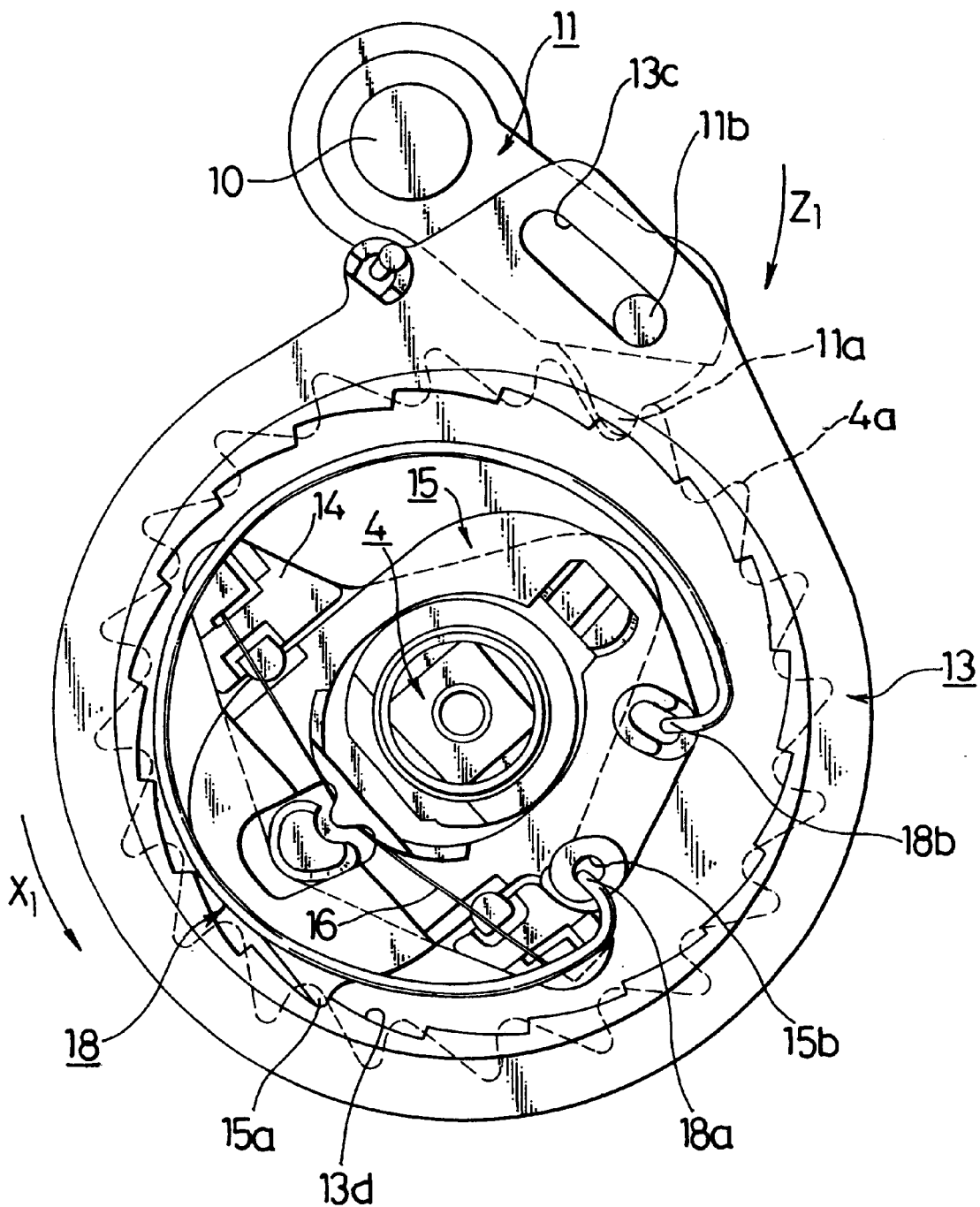
FIG. 5 illustrates operation of the locking mechanism to lock the rotation of the takeup spindle in the webbing-releasing direction upon a vehicular emergency such as a vehicular collision.

Further, when the takeup spindle 4 rotates in the webbing-releasing direction, the locking portion 15a of the lock member 15 is brought into meshing engagement with the internal teeth 13d of the latch cup 13 as illustrated in FIG. 4A. Rotational force of the flange 14 is therefore transmitted to the latch cup 13, so that the latch cup 13 is rotated integrally with the takeup spindle 4 in the direction of arrow $X_1$ against the biasing force of the return spring 12. Then, as illustrated in FIG. 5, the pawl guide slot 13c which is in engagement with the pawl guide pin 11b causes the pawl 11 to turn in the direction of arrow $Z_1$ via the pawl guide pin 11b, whereby the engaging portion 11a is brought into engagement with the latch plate 4a. As a result, the pawl 11 prevents and locks rotation of the latch plate 4a in the direction of arrow $X_1$, that is, release of the webbing.

When the vehicle is subjected to a speed change of a predetermined value or greater in the event of an emergency of the vehicle, the inertia member 37 is caused to roll to cause swinging of the sensor arm 39. An edge 39a of the sensor arm 39 is hence brought into engagement with the teeth 19a of the ratchet wheel 19, whereby rotation of the ratchet wheel 19 in the webbing-releasing direction is prevented. When the webbing is pulled out further with the ratchet wheel 19 being still prevented from rotation, the ratchet wheel 19 develops a lag in rotation relative to the rotation of the takeup spindle 4 in the webbing-releasing direction. The locking mechanism is thus actuated to lock release of the webbing as mentioned above.

Figure 6A:
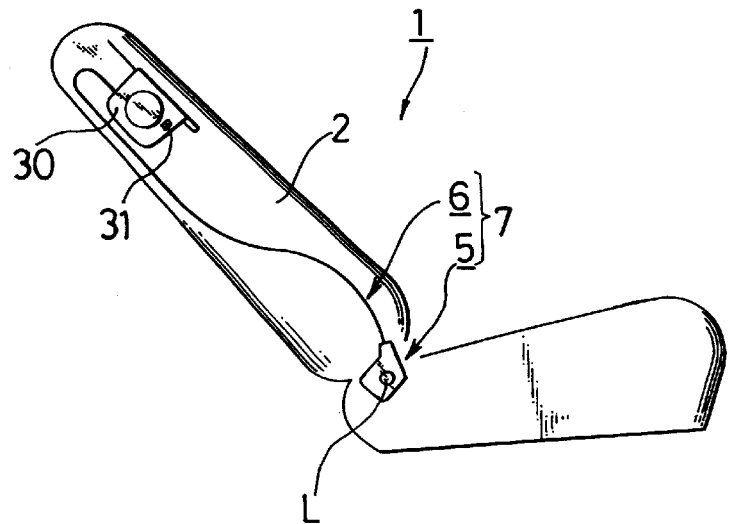
FIG. 6A is a schematic side view of the reclining seat with a backrest thereof reclined further from its position depicted in FIG. 1.
Figure 6B:
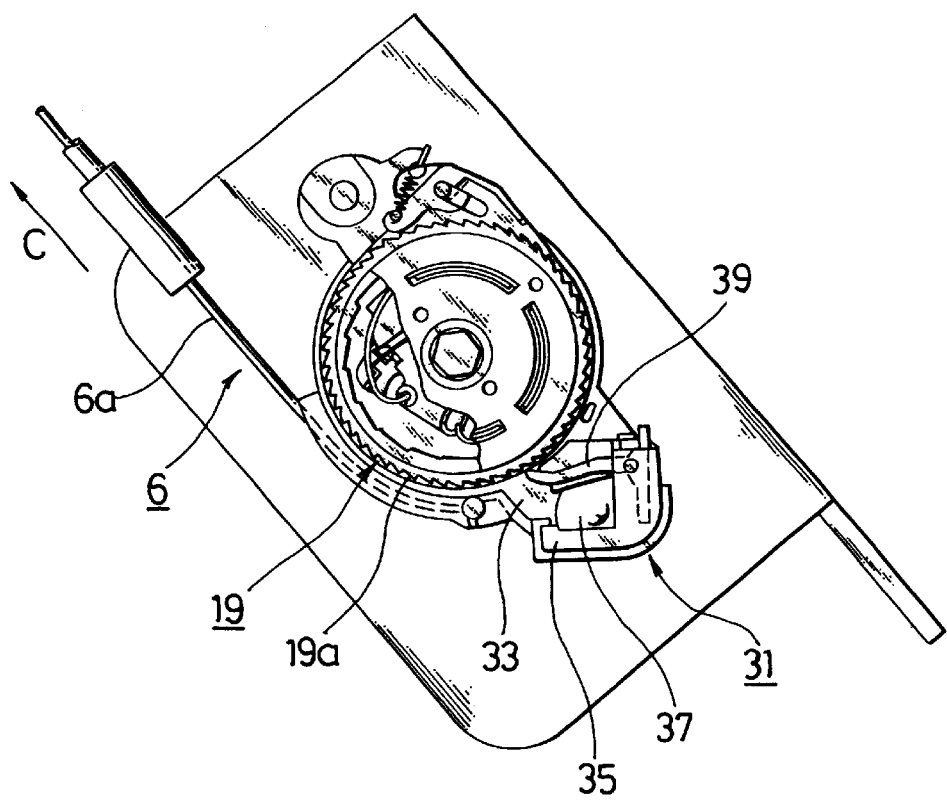
FIG. 6B is a schematic side view of the retractor in the position shown in FIG. 6A.

When the backrest 2 is reclined from the position illustrated in FIG. 1 into the position shown in FIG. 6A in this situation, the cable 6a is wound in the winding mechanism 5 of the adjusting mechanism 7. At the same time, the cable 6a is paid out in the direction of arrow C on the side of the hanger 33 as illustrated in FIG. 6B. The hanger 13 is therefore caused to turn clockwise so that the sensing member 31 is adjusted into an appropriate orientation. However, the position at which the sensor arm 39 is brought into engagement with the ratchet wheel 19a in the event of a vehicular emergency varies in the direction of the circumference of the takeup spindle 4.

Figure 4B:
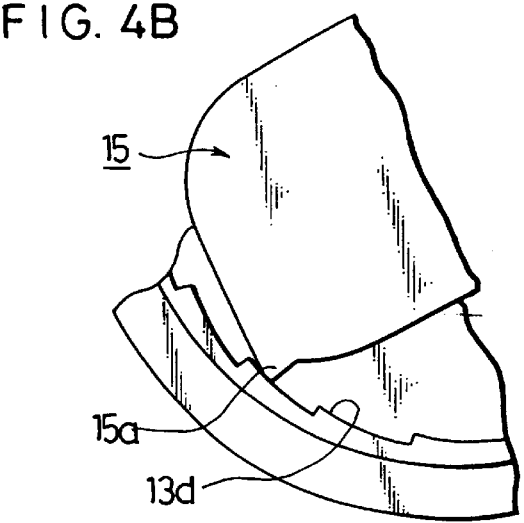

Depending on the angle of reclining (namely, the position of the sensing member 31), a potential problem may arise in that, when the rotation of the ratchet wheel 19 has been prevented owing to the engagement between the edge 39a of the sensor arm 39 and the teeth 19a of the ratchet wheel 19, the locking portion 15a of the lock member 15 may still remain out of engagement with the internal teeth 13d without taking the position shown in FIG. 4A and may assume a positional relationship with the internal teeth 13d, for example, such as that as illustrated in FIG. 4B. To move from the state of FIG. 4B to that of FIG. 4A and further to the state of FIG. 5, it is necessary to permit rotation of the takeup spindle in the webbing-releasing direction while the ratchet wheel 19 is prevented from rotation.

In this embodiment, the friction spring 18 is arranged between the lock member 15 and the ratchet wheel 19, both of which are designed to rotate integrally with the takeup spindle 4 depending on the direction of rotation, and the friction spring 18 and the ratchet wheel 19 are slidable against each other. Rotation of the takeup spindle 4 in the webbing-releasing direction can be absorbed accordingly.

Further, the internal teeth 13a are formed on the latch cup 13 only at positions predetermined in relation to the direction of rotation of the takeup spindle (at positions dividing the latch cup into 20 equal portions in the direction of the circumference of the latch cup). After the lock member 15 has moved to a position where the lock member 15 is engageable with one of the internal teeth 13a (for example, the position illustrated in FIG. 4A), the pawl 11 therefore begins for the first time its movement in a direction in which the pawl 11 is engageable with the latch plate 4a. After that, in accordance with an angle of rotation of the latch plate 4a, the pawl 11 turns over a predetermined angle and is brought into engagement with the teeth of the latch plate 4a. As the number of the internal teeth 13a of the latch cup 13 and that of the teeth of the latch plate 4a are set equal to each other, the pawl 11 is brought into engagement with one of the teeth of the latch plate 4a in the same positional relationship no matter which one of the internal teeth 13a the lock member 15 engages.

Accordingly, the pawl 11 is brought into engagement with one of the teeth of the latch plate 4a without being affected by the position of engagement between the sensor arm 39 and the teeth 19*a* of the ratchet wheel.

In this embodiment, the position where the pawl 11 is brought into engagement with the latch plate 4*a* to stop the takeup spindle 4 is always constant irrespective of the positions of the sensor arm 39 and ratchet wheel 19. The pawl 11 and the latch plate 4*a* are prevented from hitting each other at the edges thereof, so that their edges are protected from damages. Moreover, the locking of rotation in the webbing-releasing direction is not delayed.

The locking mechanism can therefore actuate properly irrespective of the angle of reclining.

It is to be noted that the present invention is not limited to the above-mentioned embodiment and that changes, modifications and the like are feasible based on the gist of the present invention. For example, the adjusting mechanism 7 in this embodiment was constructed to adjust the sensing member in an appropriate orientation by the use of winding or release of the cable. It is possible to adopt such a construction that the sensing member is adjusted into an appropriate orientation by substituting a plane cam for the winding mechanism and causing the transmission member to move on and along the plane cam in accordance with an angle of reclining. As a further alternative, it is also possible to adopt such a construction that the sensing member is allowed to adjust itself into an appropriate orientation by using its own weight. In essence, no particular limitation is imposed on the construction of the adjusting mechanism insofar as the sensing member can be adjusted into an appropriate orientation. Further, the buffer mechanism may be constructed by forming a ratchet wheel with a first portion, on which teeth are formed, and a second portion, to which the lock member is connected, and bringing these portions into frictional engagement with each other.

A This application claims the priority of Japanese Patent Application No. HEI 10-268269 filed Sep. 22, 1998, which is incorporated herein by reference.

What is claimed is:

1. A seatbelt retractor comprising:
   a retractor base adapted to be mounted on a backrests of a seat;
   a takeup spindle rotatably supported on said retractor base;
   a locking mechanism for connecting said takeup spindle and said retractor base with each other via a pawl such that rotation of said takeup spindle in a webbing-releasing direction is locked;
   a sensing member for actuating said locking mechanism by sensing at least one of a predetermined acceleration and tilting, said sensing member being supported about said takeup spindle such that said sensing member is pivotal depending on an angle of reclining of said backrest; and
   a buffer mechanism incorporated in said locking mechanism such that, after said sensing member has engaged a portion of said locking mechanism, said portion is allowed to rotate relative to said takeup spindle until said takeup spindle and said retractor base are connected with each other via said pawl.

2. A seatbelt retractor according to claim 1, wherein said locking mechanism comprises:
   a pawl supported on one of said takeup spindle and said retractor base,
   plural engaged portions with which said pawl is engageable, said plural engaged portions being arranged on the other one of said takeup spindle and said retractor base,
   a ratchet wheel with which said sensing member is engageable, said ratchet wheel being supported such that said ratchet wheel normally rotates together with said takeup spindle but, when said sensing member has been brought into engagemment with said ratchet wheel, said ratchet wheel rotates relative to said takeup spindle, and
   a transmission mechanism for transmitting rotating force of said takeup spindle to said pawl when said ratchet wheel has rotated relative to said takeup spindle; and
   said buffer mechanism is arranged between said ratchet wheel and said takeup spindle.

3. A seatbelt retractor according to claim 2, wherein said ratchet wheel is provided on an outer periphery thereof with plural engaged teeth with which said sensing member is engageable, and said buffer mechanism is arranged between said engaged teeth and said takeup spindle.

4. A seatbelt retractor according to claim 3, wherein said transmission mechanism comprises:
   a latch member connected with said pawl such that said latch member can bring said pawl into a position where said pawl is engageable with said engaged portions, and
   a lock member connected with said ratchet wheel and supported on said takeup spindle such that, when said ratchet wheel has rotated relative to said takeup spindle, said lock member can assume a position where said lock member is engageable with said latch member; and
   said buffer mechanism is arranged between said engaged teeth of said ratchet wheel and said lock member.

5. A seatbelt retractor according to claim 4, wherein said buffer mechanism comprises a friction spring maintained in frictional engagement with said ratchet wheel and secured at an end thereof on said lock member.

6. A seatbelt retractor comprising:
   a retractor base adapted to be mounted on a backrest of a seat;
   a takeup spindle rotatable supported on said retractor base;
   a locking mechanism for connecting said takeup spindle and said retractor base with each other via a pawl such that rotation of said takeup spindle in a webbing-releasing direction is locked;
   a sensing member for actuating said locking mechanism by sensing at least one of a predetermined acceleration and tilting, said sensing member being supported about said takeup spindle such that said sensing member is pivotal depending on an angle of reclining of said backrest; and
   a buffer mechanism incorporated in said locking mechanism such that, after said sensing member has engaged a portion of said locking mechanism, said portion is allowed to rotate relative to said takeup spindle until said takeup spindle and said retractor base are connected with each other via said pawl;
   wherein said locking mechanism comprises:
      a pawl supported on one of said takeup spindle and said retractor base,
      plural engaged portions with which said pawl is engageable, said plural engaged portions being arranged on the other one of said takeup spindle and said retractor base, a ratchet wheel with which said sensing member is engageable, said ratchet wheel being supported such that said ratchet wheel normally rotates together with said takeup spindle but, when said sensing member has been brought into engagement with said ratchet wheel, said ratchet wheel rotates relative to said takeup spindle, and a transmission mechanism for transmitting rotating force of said takeup spindle to said pawl when said ratchet wheel has rotated relative to said takeup spindle;

wherein said ratchet wheel is provided on an outer periphery thereof with plural engaged teeth with which said sensing member is engageable;

wherein said transmission mechanism comprises:

latch member connected with said pawl such that said latch member can bring said pawl into a position where said pawl is engageable with said engaged portions, and a lock member connected with said ratchet wheel and supported on said takeup spindle such that, when said ratchet wheel has rotated relative to said takeup spindle, said lock member can assume a position where said lock member is engageable with said latch member; and said buffer mechanism is arranged between said engaged teeth of said ratchet wheel and said lock member;

wherein said latch member has plural engaged teeth with which said lock member is engageable, and the number of said engaged teeth of said latch member is equal to the number of said engaged portions of said locking mechanism.

7. A seatbelt retractor comprising:

a retractor base adapted to be mounted on a backrest of a seat;

a takeup spindle rotatable supported on said retractor base;

a locking mechanism for connecting said takeup spindle and said retractor base with each other via a pawl such that rotation of said takeup spindle in a webbing-releasing direction is locked;

a sensing member for actuating said locking mechanism by sensing at least one of a predetermined acceleration and tilting, said sensing member being supported about said takeup spindle such that said sensing member is pivotal depending on an angle of reclining of said backrest; and a buffer mechanism incorporated in said locking mechanism such that, after said sensing member has engaged a portion of said locking mechanism, said portion is allowed to rotate relative to said takeup spindle until said takeup spindle and said retractor base are connected with each other via said pawl;

wherein said locking mechanism comprises:

a pawl supported on one of said takeup spindle and said retractor base, plural engaged portions with which said pawl is engageable, said plural engaged portions being arranged on the other one of said takeup spindle and said retractor base, a ratchet wheel with which said sensing member is engageable, said ratchet wheel being supported such that said ratchet wheel normally rotates together with said takeup spindle but, when said sensing member has been brought into engagement with said ratchet wheel, said ratchet wheel rotates relative to said takeup spindle, and a transmission mechanism for transmitting rotating force of said takeup spindle to said pawl when said ratchet wheel has rotated relative to said takeup spindle;

wherein said ratchet wheel is provided on an outer periphery thereof with plural engaged teeth with which said sensing member is engageable;

wherein said transmission mechanism comprises:

a latch member connected with said pawl such that said latch member can bring said pawl into a position where said pawl is engageable with said engaged portions, and a lock member connected with said ratchet wheel and supported on said takeup spindle such that, when said ratchet wheel has rotated relative to said takeup spindle, said lock member can assume a position where said lock member is engageable with said latch member; and said buffer mechanism is arranged between said engaged teeth of said ratchet wheel and said lock member;

wherein said latch member has plural engaged teeth with which said lock member is engageable, and the number of said engaged teeth of said latch member is equal to the number of said engaged portions of said locking mechanism;

wherein the number of said engaged teeth arranged on said outer periphery of said ratchet wheel is greater than the number of said engaged portions of said locking mechanism.

8. A seatbelt retractor according to claim 2, wherein said sensing member comprises:

a case pivotally arranged about said takeup spindle, an inertia member supported on said case, and a sensor arm engageable with said ratchet wheel in response to an actuation of said inertia member.

9. A seatbelt retractor comprising:

a retractor base adapted to be mounted on a backrest of a seat;

a takeup spindle rotatably supported on said retractor base;

a locking mechanism for connecting said takeup spindle and said retractor base with each other via a pawl such that rotation of said takeup spindle in a webbing-releasing direction is locked;

a sensing member for actuating said locking mechanism by sensing at least one of a predetermined acceleration and tilting, said sensing member being supported about said takeup spindle such that said sensing member is pivotal depending on an angle of reclining of said backrest; and a locking adjusting mechanism incorporated in said locking mechanism such that said takeup spindle and said retractor base are connectable in a predetermined relationship via said pawl irrespective of a position of said sensing member relative to said retractor base, wherein said sensing member engages a portion of said locking mechanism on any position of engagement.

10. A seatbelt retractor according to claim 9, wherein said locking mechanism comprises:

a pawl supported on one of said takeup spindle and said retractor base, plural engaged portions with which said pawl is engageable, said plural engaged portions being arranged on the other one of said takeup spindle and said retractor base, a ratchet wheel with which said sensing member is engageable, said ratchet wheel being supported such that said ratchet wheel normally rotates together with said takeup spindle but, when said sensing member has been brought into engagement with said ratchet wheel, said ratchet wheel rotates relative to said takeup spindle, and a transmission mechanism for transmitting rotating force of said takeup spindle to said pawl when said ratchet wheel has rotated relative to said takeup spindle; and said locking adjusting mechanism is arranged in said transmission mechanism.

11. A seatbelt retractor according to claim 10, wherein said transmission mechanism comprises:

a latch member connected with said pawl such that said latch member can bring said pawl into a position where said pawl is engageable with said engaged portions, and a lock member connected with said ratchet wheel and supported on said takeup spindle such that, when said ratchet wheel has rotated relative to said takeup spindle, said lock member can assume a position where said lock member is engageable with said latch member; and said locking adjusting mechanism is arranged between said ratchet wheel and said latch member.

12. A seat belt retractor according to claim 11, wherein said locking adjusting mechanism is provided with a predetermined number of engaged teeth formed on said latch member, and said engaged teeth of said locking adjusting mechanism performs a restriction such that said lock member and said latch member are engageable only at a predetermined position in a direction of rotation of said takeup spindle.

13. A seatbelt retractor according to claim 12, wherein the number of said engaged portions of said locking mechanism is equal to the number of said engaged teeth of said latch member.

14. A seatbelt retractor according to claim 13, wherein said ratchet wheel is provided on an outer periphery thereof with plural engaged teeth with which said sensing member is engageable, and the number of said engaged teeth of said ratchet wheel is greater than the number of said engaged teeth of said latch member.

15. A seatbelt retractor comprising:

a retractor base adapted to be mounted on a backrest of a seat;

a takeup spindle rotatable supported on said retractor base;

a pawl supported on one of said takeup spindle and said retractor base;

plural engaged portions with which said pawl is engageable, said plural engaged portions being arranged on the other one of said takeup spindle and said retractor base;

a sensing at least one of member for sensing a predetermined acceleration and tilting, an adjusting mechanism for causing said sensing member to move relative to said retractor base depending on an angle of reclining of said backrest such that the spatial orientation of said sensing member is adjusted into a suitable orientation;

a transmission mechanism for transmitting rotation of said takeup spindle to said pawl upon actuation of said sensing member such that said pawl is brought into engagement with said engaged portions, said transmission mechanism assuming one of a connected position in which said transmission mechanism transmits rotation of said takeup spindle to said pawl and a non-connected position in which said transmission mechanism does not transmit rotation of said takeup spindle to said pawl;

a ratchet wheel connected with said transmission mechanism and having engaged portions with which said sensing member can be brought into engagement upon actuation of said sensing member; and a buffer mechanism arranged between said engaged portions of said ratchet wheel and said transmission mechanism and, after said sensing member has been brought into engagement with said ratchet wheel, allowing said transmission mechanism to move from said non-connected position to said connected position and also said pawl to engage said engaged portions arranged on the other one of said takeup spindle and said retractor base.

16. A seatbelt retractor according to claim 15, wherein said transmission mechanism is provided with a locking adjusting mechanism for bringing said pawl into engagement with said engaged portions in a predetermined relationship irrespective of a position of engagement between said sensing member and sad ratchet wheel.

17. A seatbelt retractor comprising:

a retractor base adapted to be mounted on a backrest of a seat;

a takeup spindle rotatably supported on said retractor base;

a pawl supported on one of said takeup spindle and said retractor base;

plural engaged portions with which said pawl is engageable, said plural engaged portions being arranged on the other one of said takeup spindle and said retractor base;

a sensing member for sensing at least one of a predetermined acceleration and tilting, an adjusting mechanism for causing said sensing member to move relative to said retractor base depending on an angle of reclining of said backrest such that the spatial orientation of said sensing member is adjusted into a suitable orientation;

a transmission mechanism for transmitting rotation of said takeup spindle to said pawl upon actuation of said sensing member such that said pawl is brought into engagement with said engaged portions;

a ratchet wheel connected with said transmission mechanism and having engaged portions with which said sensing member can be brought into engagement upon actuation of said sensing member; and a locking adjusting mechanism for bringing said pawl into engagement with said engaged portions in a predetermined relationship irrespective of a position of engagement between said sensing member and said ratchet wheel, said locking adjusting mechanism being incorporated in said transmission mechanism.

\* \* \* \* \*